United States Patent
Mather

(10) Patent No.: US 7,516,297 B2
(45) Date of Patent: Apr. 7, 2009

(54) MEMORY MANAGEMENT

(75) Inventor: Clifford J. Mather, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/272,155

(22) Filed: Nov. 10, 2005

(65) Prior Publication Data

US 2007/0106875 A1    May 10, 2007

(51) Int. Cl.
  *G06F 12/00*  (2006.01)
(52) U.S. Cl. ................... 711/205; 711/207
(58) Field of Classification Search .......... None
  See application file for complete search history.

(56) References Cited

U.S. PATENT DOCUMENTS

| | | | |
|---|---|---|---|
| 6,378,059 B1 * | 4/2002 | Miyoshi | 711/203 |
| 6,715,057 B1 | 3/2004 | Kessler et al. | |
| 2002/0133685 A1 | 9/2002 | Kalyanasundharam | |
| 2002/0169936 A1 | 11/2002 | Murphy | |
| 2005/0193169 A1 * | 9/2005 | Ahluwalia | 711/115 |
| 2005/0223321 A1 | 10/2005 | Mather et al. | |

* cited by examiner

*Primary Examiner*—Brian R Peugh

(57) ABSTRACT

Systems, methods, and devices are provided for memory management. One method embodiment includes providing an operating system capable of supporting variable page sizes. The method includes providing a virtual memory address, translating the virtual memory address to a virtual memory page, and mapping the virtual memory page to a physical memory page by using a multilevel page table whose depth and/or order corresponds to page sizes that are supported by an operating system and/or hardware.

20 Claims, 5 Drawing Sheets

MEMORY MANAGEMENT

BACKGROUND

In an operating system parlance, the kernel is the set of modules forming the core of the operating system. The kernel is loaded into main memory first on startup of a computer and remains in main memory providing services such as memory management, process and task management, and disk management. The kernel also handles such issues as startup and initialization of the computer system.

Before a computing device such as a desktop computer, laptop, server workstation, etc., may accomplish a desired task, it receives an appropriate set of executable instructions. Executed by a processor, these executable instructions can be used to direct the operation of the device. These instructions can be stored in a memory of the computing device.

In some systems, virtual memory is used to locate data in physical memory. Virtual memory is a technique within the memory management subsystem to allow the processor to access a larger memory address space than the physical memory space that actually exists in the processor system of a computing device. In particular, the operating system can implement a virtual memory system to map a virtual address associated with a process from a large virtual address space to a physical address of a physical memory, which is typically random access memory (RAM).

The translation can be transparent to the program. The memory management system of the operating system tracks both assigning and releasing memory in connection with the multiple processes and threads. A computer system is not limited to a single virtual address space. Indeed, it may implement as many virtual address spaces as its operating system is capable of supporting. For example, modern operating systems often support multiple processors and multiple threads of execution, thereby allowing the sharing of the system resources and further providing multiple concurrent processes and threads that execute simultaneously. The virtual address spaces are usually separate from each other to prevent overlapping processes and/or data.

To aid the mapping process, the virtual address memory space can be divided into chunks of memory space called pages which correspond to chunks of physical address memory space called frames, or physical pages. Some systems use pages that are uniform in size, however, some systems can support multiple page sizes and, in such systems, organization of such pages has typically been handled as if the pages were uniform.

Operating systems can store maps of virtual to physical pages in data structures known as page tables. In systems using non-uniform page sizes, page sizes can range, for example, from below 4 KB to over 4 GB. Typically, page tables reference individual pages by using a separate data structure for each page in a page table. In such systems, larger pages can be represented as collections of smaller sized pages. For example, if a typical page size in a system is 4 KB, a larger 1 MB page may be broken into 4 KB segments when referenced in the page table. Using a separate data structure to reference each smaller page, within a larger page, results in inefficient memory use.

Typically, an operating system maintains a separate page table for each process (i.e., each running instance of a program). These page tables can exist in a main memory location (e.g., volatile memory such as RAM) and can occupy significant portions of this main memory.

Therefore, many operating systems have to provide the ability to page their page tables. This involves writing kernel memory and data structures (e.g., page tables), which describe application memory, to secondary memory (i.e., to non-volatile memory or to a storage device), when main memory is low. Paging the page table can result in implementation of complicated logic and it can slow the operation of application processes by utilizing additional access to secondary memory.

Furthermore, many systems that may use multilevel page tables do not match the order of the page table levels and the depth of the page tables to the various page sizes supported by the OS and/or hardware, but rather use arbitrary page sizes and/or do not provide a useful granularity that reduces processor and memory resource usage.

DETAILED DESCRIPTION

Embodiments include systems, methods, and devices, including executable instructions, for memory management. For example, one method embodiment includes providing an operating system capable of supporting variable page sizes, providing a virtual memory address and, translating the virtual memory address to a virtual memory page. According to various embodiments, executable instructions can be executed to map a virtual memory page having a variable size to a physical memory page by using a multilevel page table whose depth depends on one or more page sizes supported by system hardware and/or software.

According to various embodiments, a single data structure can be used to reference a virtual memory page. In such embodiments, the order of sub-arrays of the multilevel page table and the depth of the multilevel page table can correspond to the various page sizes supported by system hardware and/or software. Such embodiments can reduce the size of the page table, can result in fewer cache misses, can result in more efficient memory use, and can thereby result in less processor time used in accessing, navigating, and utilizing the pages.

Figure 1A:
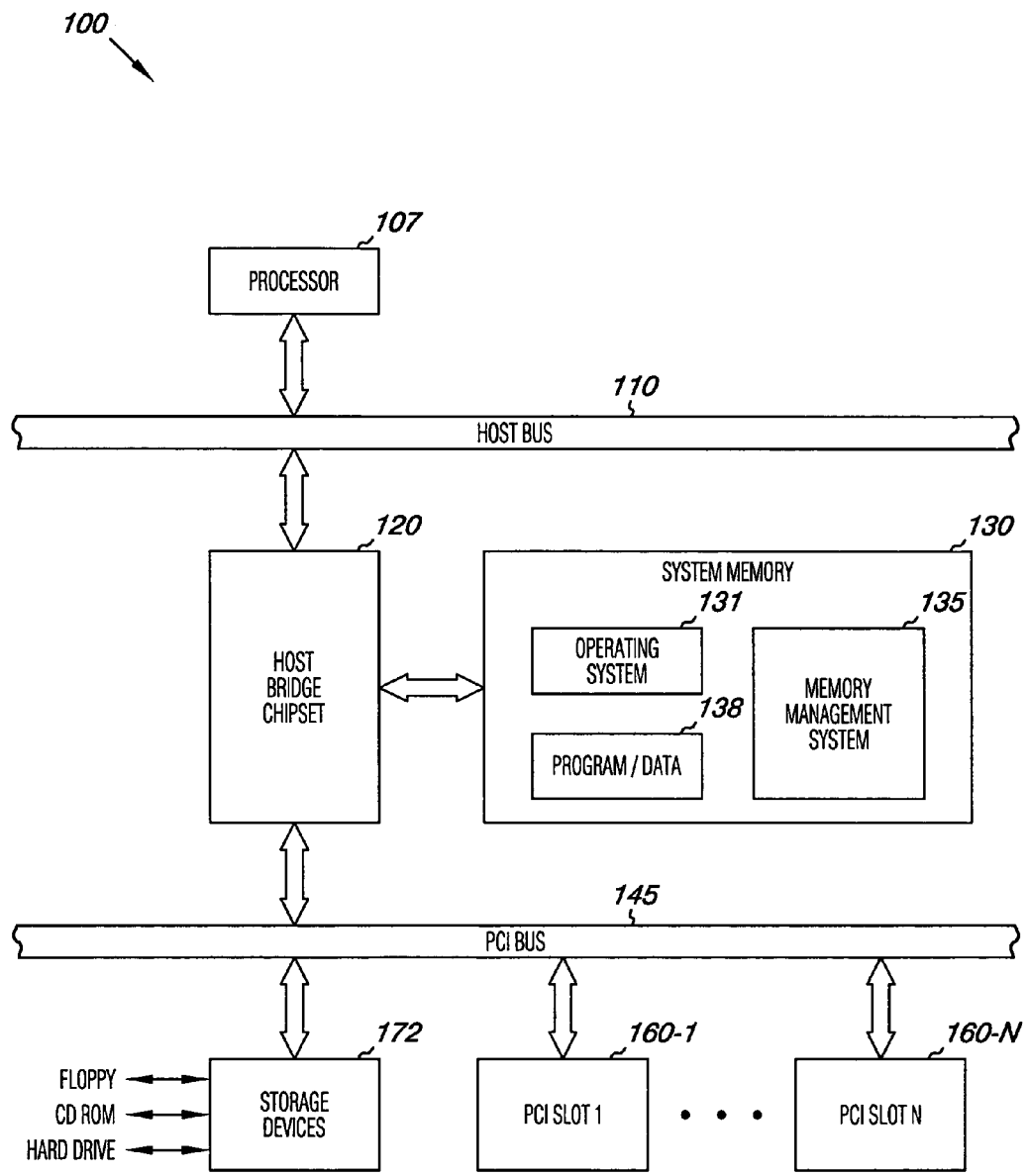
FIG. 1A illustrates an example of a computing device suitable to implement embodiments of the present disclosure.

FIG. 1A illustrates an embodiment of a computing device suitable to implement embodiments of the present disclosure. The term "a" should be construed herein to mean "one or more" unless a component is explicitly stated as singular or unless multiple components would be impractical. Further, the use of "N" also indicates "one or more" unless a specific number of components is explicitly stated as limiting the number of components.

The system or computing device 100 shown in FIG. 1A illustrates a processor 107, a host bus 110, a host bridge chipset 120, a system memory 130, a peripheral component interconnect (PCI) bus 145, PCI slots 160-1 to 160-N (e.g., slots for I/O circuit cards, controller cards, and other removable devices), and one or more storage devices (e.g., disks, CDs, hard drives, removable memory, etc.), shown generally as 172.

The processor can be of various architectures. For example, the processor can have an architecture capable of supporting a range of page sizes (e.g., precision architecture reduced instruction set computer (PA-RISC), Itanium Processor Family (IPF), etc.). Embodiments of the disclosure can be implemented in a multi-processor or single processor system or computing device. Embodiments described herein can similarly be implemented in a distributed computing network environment.

The host bridge chipset 120 includes a number of interface circuits to allow the host processor 107 to access the system memory 130 and/or the PCI bus 145. The system memory 130 represents one or more mechanisms for storing information. For example, the system memory 130 may include non-volatile and/or volatile memory types. Examples of these memory types include flash memory, read only memory (ROM), RAM, etc. Non-volatile and volatile memory can also include memory provided on storage devices, such on disks, drives, and other such form factors.

The allocation of memory space for use as the system memory 130 may be loaded with an operating system 131 (e.g., in RAM). Examples of operating systems include, but are not limited to, Windows, Mac OS, Unix, Linux, etc. As stated above, some operating systems are capable of supporting variable page sizes. HP-UX, among others, is one such example.

In the embodiment of FIG. 1A, the system memory 130 further includes a memory management system 135 and other programs and data 138. The memory management system 135 can include a virtual memory subsystem associated with a given operating system 131. An operating system can implement a virtual memory system to map a virtual address associated with a process from a virtual address space to a physical address of a physical memory, which is typically in RAM.

The memory management system 135 can also include programs, code, data, look-up tables (e.g., page tables), and other such data and/or instructions to support the management of memory in connection with program applications being executed by a processor. As will be discussed further in connection with FIGS. 1B, 2, and 3, a page table can be maintained in memory and can be used to link a virtual page to a physical page in memory.

The PCI slots 160-1 to 160-N provide interfaces to PCI devices. Examples of PCI devices can include printers, removable disk storage and databases, facsimiles, scanners, network interface devices, media interface devices, etc. Storage devices 172 can include electronic, magnetic, and/or optical media devices such as hard drives, flash memory devices, CD ROMs, DVDs, and tapes, among other media device types.

Figure 1B:
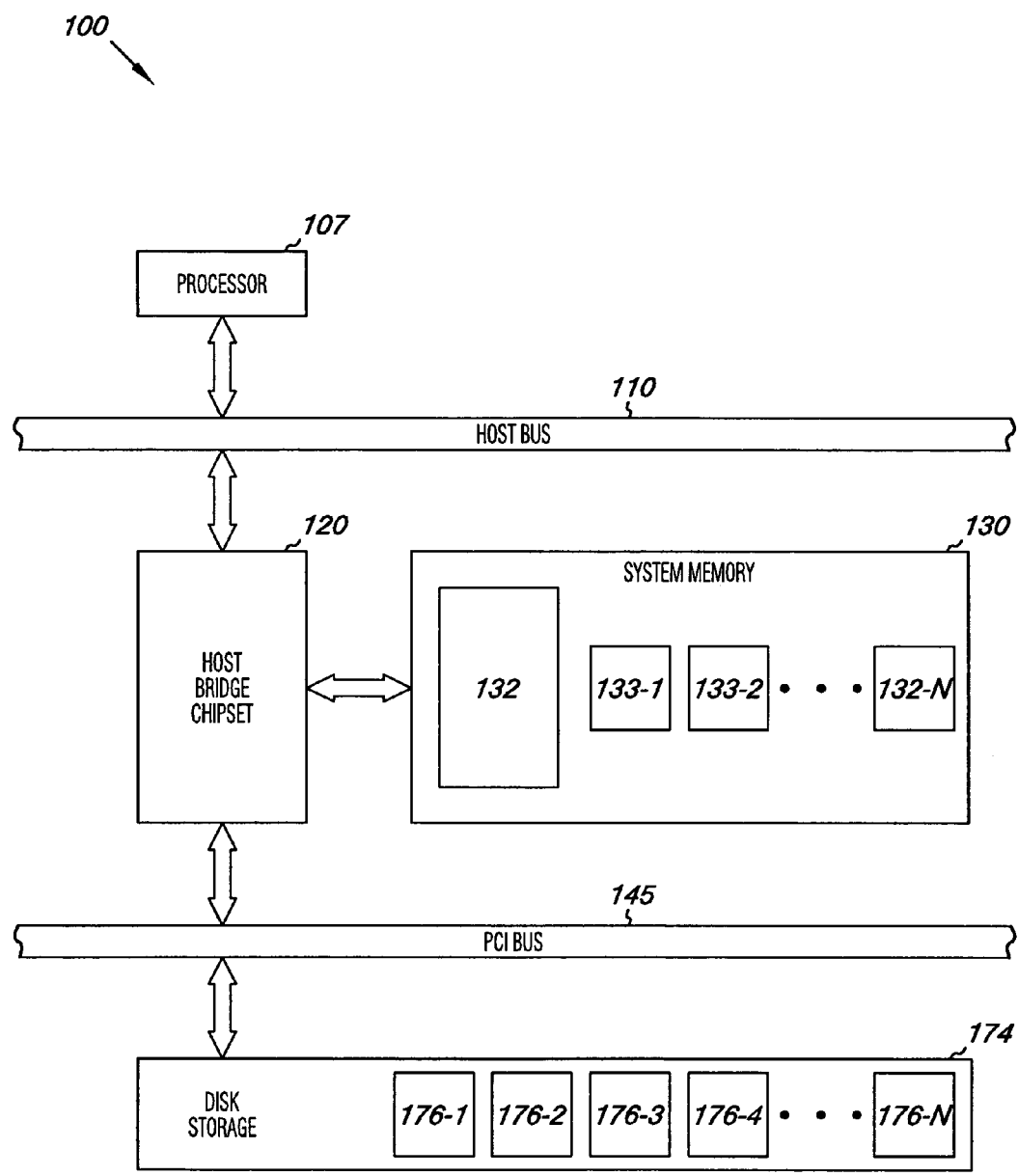
FIG. 1B illustrates a computing device including an embodiment of a page table that can map a virtual memory address to a physical memory address.

FIG. 1B illustrates a computing device including an embodiment of a page table that can map a virtual memory page to a physical memory page. FIG. 1B illustrates a computing device such as computing device 100 shown in FIG. 1A. However, FIG. 1B illustrates a system memory 130 that contains a multilevel page table 132 as well as physical pages 133-1 to 133-N. The physical pages 133-1 to 133-N can reside in main memory. The multilevel page table 132 can exist within memory management system 135 and can be managed by the operating system 131. FIG. 1B further illustrates physical pages 176-1 to 176-N located in a storage device 174 (e.g., disk storage).

As described in greater detail in connection with FIGS. 2 and 3, the multilevel page table 132 is capable of being configured, such as by the manufacturer, or via the operating system, such that it can have a depth (i.e., the number of levels in the page table) and order (i.e., the number of elements in each sub-array) that is matched to one or more of the various page sizes supported by a particular system hardware (e.g., system processor 107). As will be described in greater detail in connection with FIGS. 2 and 3, the multilevel page table 132 describes an array of elements having fixed sizes. The size of the array and the size of the elements can correspond to the size of a virtual address space. Although the example provided uses fixed sized elements, some embodiments could utilize variable sized elements.

Figure 2:
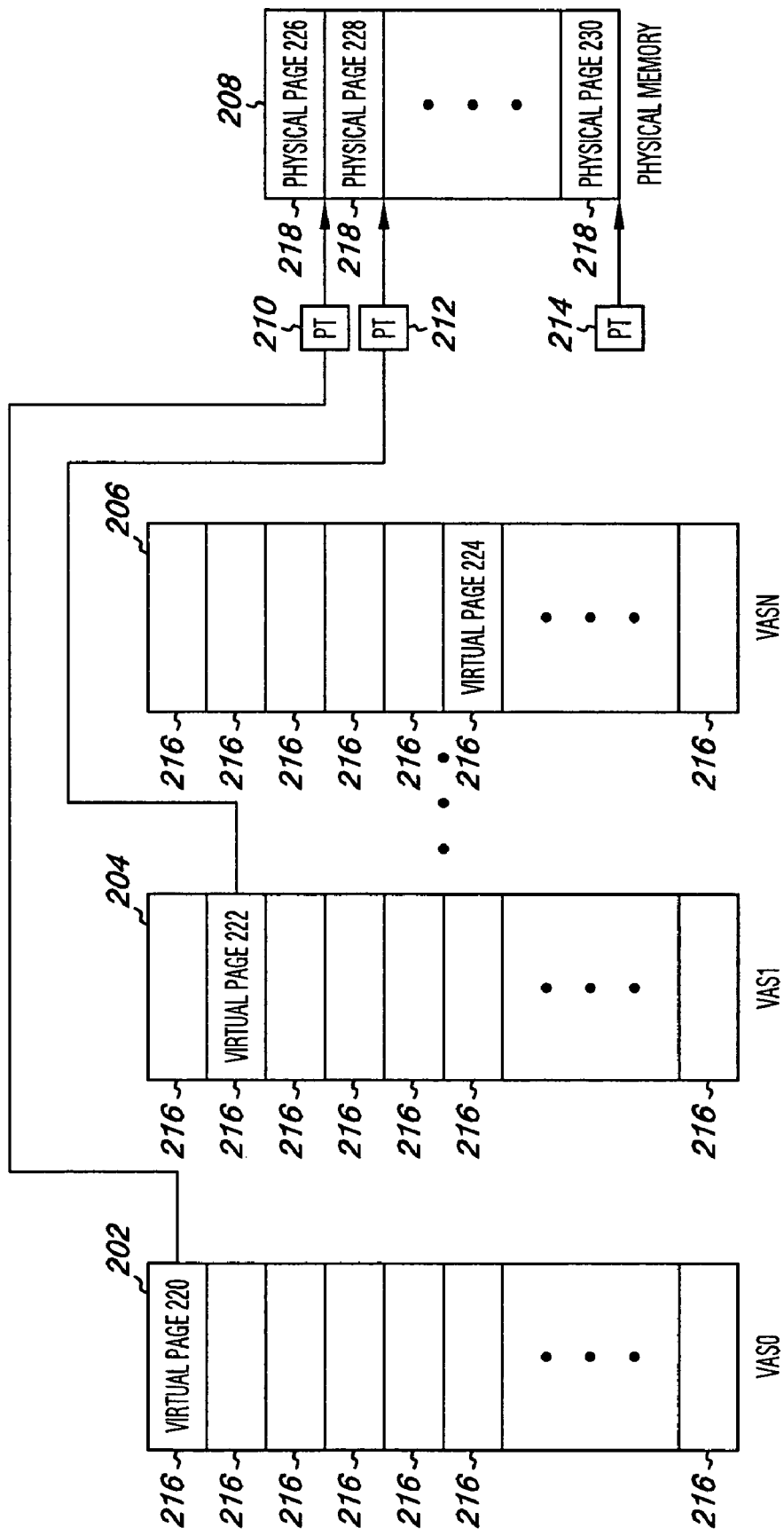
FIG. 2 illustrates a method of mapping virtual memory pages to physical memory pages.

FIG. 2 illustrates a method of mapping virtual memory pages to physical memory pages. FIG. 2 illustrates a number of virtual address spaces (VASs), e.g., 202 (VAS0), 204 (VAS1), and 206 (VASN). Each of the virtual address spaces 202, 204, and 206 can be provided with an associated page table for mapping virtual memory addresses to physical memory addresses. In the embodiment of FIG. 2, the virtual address spaces 202, 204, and 206 are associated with page tables 210, 212, and 214, respectively. Each of the virtual address spaces 202, 204, and 206 has a plurality of virtual pages 216. A physical memory 208 includes a plurality of physical pages 218.

The virtual pages 216 and physical pages 218 are typically of the same size and typically range in size from below 4 KB to over 4 GB. Embodiments, however, are not so limited and computer systems may employ any suitable page size, which can be selected by the operating system, based on supporting hardware.

Furthermore, as previously discussed, embodiments according to the present disclosure support virtual pages 216, within a virtual address space (e.g., VAS0 to VASN), that can have a non-uniform size. As will be discussed in connection with FIG. 3, page tables (e.g., 210, 212, and 214) illustrated in FIG. 2 can be multilevel page tables that can map pages having differing sizes.

In the configuration of FIG. 2, pages in the virtual address spaces 202, 204, and 206 are mapped to pages in the physical memory 208 via page tables 210, 212, and 214, respectively. For example, a virtual page 220 in the virtual address space 202 can be mapped via page table 210 to physical page 226. Likewise, a virtual page 222 in the virtual address space 204 can be mapped to physical page 228 through page table 212 while virtual page 224 of the virtual address space 206 is mapped to physical page 220 via page table 214. In those instances where a page is not present in the physical memory (e.g., RAM), a page fault can be generated to load the page from a secondary memory (e.g., a secondary storage device).

Figure 3:
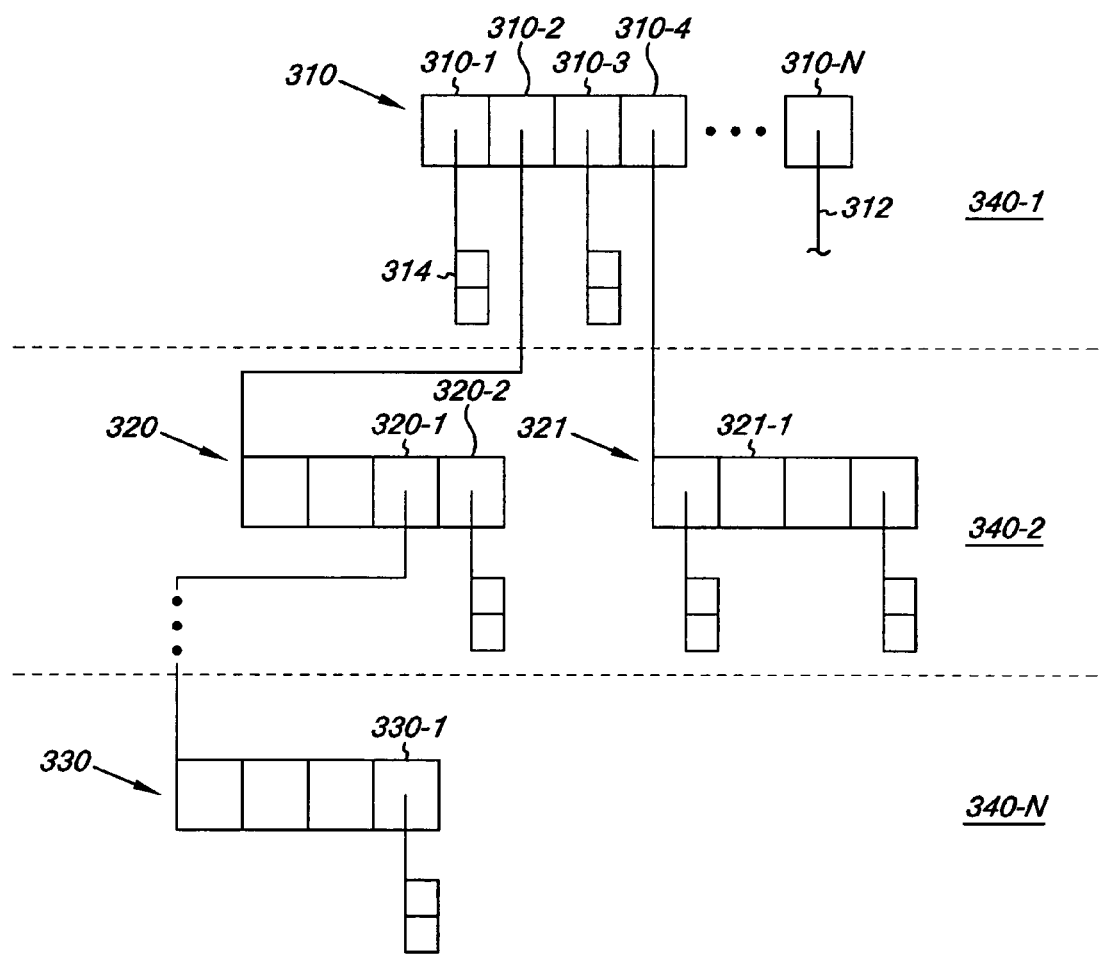
FIG. 3 illustrates a multilevel page table structure suitable to implement embodiments of the present disclosure.

FIG. 3 illustrates a multilevel page table structure suitable to implement embodiments of the present disclosure. The page table structure of FIG. 3 illustrates an embodiment of a multilevel page table 132 of the present disclosure. As discussed below, executable instructions can execute to configure multilevel page tables 132 such that the order of each page table level and/or the depth of each page table corresponds to the number and size of a number of the various page sizes supported by a particular operating system and/or hardware.

In the embodiment illustrated in FIG. 3, the first level 340-1, of the page table contains a base array 310 composed of array elements 310-1 to 310-N. The base array 310 can describe an application memory object with the base array elements 310-1 to 310-N representing a fixed amount of virtual memory (e.g., 4 KB, 1 MB, 4 GB, etc.). The amount of virtual memory described by a base array can depend on the amount of virtual address space available within a particular architecture. For example, a 32-bit architecture can have a 4 GB (i.e., 2$^{32}$ byte) virtual address space, while other architectures (e.g., 64-bit architectures) can have larger virtual address spaces. Embodiments of the present disclosure are not limited to these examples.

The array elements 310-1 to 310-N have pointers 312 that point to particular data structures (e.g., arrays, references, data trees, etc.). For example, the base array element 310-1 "points" to a reference data structure 314. This reference data structure provides a mechanism by which the kernel can locate a page in system memory 130 that corresponds to a requested virtual address. Data structures, such as data structure 314, can be any appropriate reference data structure. For example, a data structure can be a virtual frame descriptor disk block descriptor (vfddbd) data reference structure. A vfddbd is a reference data structure used to locate pages in memory in an HP-UX system and is provided as a suitable example of one such data reference structure.

As will be discussed in detail below with respect to the embodiment of FIG. 3, the array pointer 312 of an array element (e.g., 310-1, 310-2, 321-1, 330-1, etc.) may point to a single page (i.e., the array element is mapped by a single page), a collection of pages (i.e., a sub-array representing an element at a finer granularity), or to "null" (i.e., the element is "nonresident," e.g., sub-array element 321-1, and the corresponding virtual memory space is currently unoccupied). For example, the array pointer of base array element 310-2 points to a sub-array 320 located at second level 340-2 (e.g., the next lower level) of the page table. Similarly, the array pointer of base array element 310-4 points to sub-array 321.

As will be discussed in further detail below, the configuration of a multilevel table in the above manner can provide direct access to pages in the page table and to sub-arrays describing array elements. Providing direct access facilitates more efficient searching of the page table based on a virtual address. That is typically because the searching does not use key comparisons, as used by other data structures such as balanced trees (b-trees), to find the next level to search.

For base array elements (e.g., 310-1 to 310-N) mapped by a single page (e.g., 310-1 and 310-3), the array pointers 312 point to referencing data structures 314, which reference the location of a page in physical memory. For example, a data structure 314 can reference a page located in a main memory location 133-1 and/or 133-2, and/or a page located in a secondary memory location 176-1, 176-2, and/or 176-3 as discussed in FIG. 1 for example, among other locations.

By way of example, the embodiment illustrated in FIG. 3 depicts sub-arrays (e.g., 320, 321, and 330) at lower levels 340-2 to 340-N as each containing four fixed size elements (i.e., the order of the sub-arrays is four). The sub-arrays are shown having of four elements, as an example of one suitable manner in which the arrays can be structured. This example also illustrates how page and memory sizes can be represented in multiples of four (e.g., 4 KB, 16 KB, etc.).

In such embodiments, sub-arrays of pages having a next smaller page size can include elements having a size one fourth as large as the element which they describe. For example, if base array 310 includes four elements 310-1 to 310-4, each representing 1 GB of virtual address space size, then sub-array 320 could include elements each having a size of 256 MB, e.g., the next smaller page size. As will be further discussed below, by associating the order of a page table sub-array to page sizes supported by an operating system and/or hardware the use of such structures can reduce memory cost and increase search speed.

In the above example, the order of each sub-array (e.g., 320, 321, and 330) is four; however, embodiments of the present disclosure are not limited to a specific order for each sub-array. The order of each sub-array can, for example, be configurable by an operating system.

For instance, multilevel page tables 132 may be configured in an HP-UX system such that the sub-arrays are of order four. This structure corresponds with the page sizes (designed to utilize page sizes in orders of four) supported by the system. In such systems, the system is designed to support numerous page sizes in multiples of four (e.g., 64 KB, 256 KB, 1 MB, 4 MB, 16 MB, etc.). In this way, each sub-array element (e.g., 320-1, 320-2, 321-1, etc.) is capable of representing a single page having a size corresponding to a page size supported by the system. For instance, in some such systems, a large page size can be 4 GB with further levels of granularity provided in powers of four (e.g., 4 GB, 1 GB, 256 MB, 64 MB, 16 MB, 4 MB, 1 MB, 256 KB, 64 KB, 16 KB, and 4 KB). The above example provides 11 levels of granularity that can be utilized. Depending upon the system, the ranges of granularity can be larger or smaller than those described above.

In the above example, sub-array 320 can be viewed as a "sub-page table." That is, sub-array 320 may be viewed as describing a 1 GB memory object, with each sub-array element (e.g., 320-1 and 320-2) describing 256 MB of virtual address space. The term object refers to a block of data, text, or graphics that can be created by executable instructions and can be used to perform a task. In this way, each sub-array element (e.g., 320-1, 320-2, etc.) can represent a single page in memory such that a single reference data structure 314 can be used to reference the page.

To further illustrate the above example, sub-array 330 in the embodiment of FIG. 3 can represent a third level (e.g., the next level below second level 340-2). In this example, each of the four sub-array elements in sub-array 330 can describe 64 MB of virtual address space and can be capable of being mapped to a physical page having a size of 64 MB. For example, sub-array element 330-1 would point to (via a reference data structure 314) a 64 MB page in memory.

In the embodiment illustrated in FIG. 3, sub-array 330 represents one sub-array at a lowest level 340-N. However, as discussed herein one or more sub-arrays may exist at various lower levels, such as at levels 340-2 to 340-N of FIG. 3.

In some embodiments, the number of sub-arrays can be a fixed number or can vary. For instance, in various embodiments, the number of sub-arrays in each level can depend on how many elements in the level above are mapped by a collection of smaller sized pages (i.e., the number of sub-arrays at a particular level depends on how many array elements in the next level above are represented at a finer granularity). For example, level 340-2 contains two sub-arrays 320 and 321, as illustrated in the embodiment of FIG. 3. That is because elements 310-1 and 310-4 are mapped by a collection of pages which utilize the sub-array structures provided in other levels (e.g., lower levels) of the table. However, level 340-2 can include more sub-arrays if other base array elements (e.g., 310-1, 310-3, 310-N) were also mapped by a collection of pages. Accordingly, in such embodiments, the page table can be tailored to the particular page being represented. As a further example, a third level (i.e., the next level below level 340-2) can include eight sub-arrays if each sub-array element in sub-arrays 320 and 321 were represented at a finer granularity.

According to embodiments of the present disclosure, executable instructions can execute to configure the depth of a multilevel page table 132. As previously mentioned, the depth of the multilevel page table (i.e., the total number of levels) can be configurable, and can depend on the level of granularity used by a process (e.g., the number of different page sizes supported by a system, etc.) The embodiment of FIG. 3 illustrates that the page table may include several subsequent sub-levels to a lowest sub-level 340-N. Reducing the number of levels in a multilevel page table can reduce the cache misses associated with searching multiple levels.

For example, if a memory object were represented by four different page sizes (e.g., 1 GB, 256 MB, 64 MB, and 16 MB), with each page size being supported by the operating system and hardware, then executable instructions can be executed to configure a page table having a depth of four, based upon a power of four structure.

By configuring the multilevel page table in the above manner (i.e., bounding the number of page table levels at four), the system can better utilize it memory and processor resources with respect to the system's ability to support large page sizes and variable page sizes. Further, by configuring a page table to have a finer granularity, the structure reduces the likelihood of cache misses.

As discussed previously, base arrays 310 can include various numbers of base array elements 310-1 to 310-N. Also, base array elements can have non-uniform sizes. However, uniformly sized array elements can be used to facilitate translation from virtual pages to physical pages in a logical and organized manner in some systems because the memory space can still be parsed into a calculable number of memory spaces, among other benefits. For example, the array elements in the multilevel page table illustrated in FIG. 3 can be mapped by a single page (e.g., if each element describes 256 MB of virtual address space, for example, then each element could be mapped to a single 256 MB physical page). Therefore, it can be convenient to have the size of the array elements correspond with the size of a physical page frame, which can be divided into uniform chunks.

As discussed above, each base array element (e.g., 310-1 to 310-N) can be represented as a page (e.g. 310-1 and 310-3) or a collection of one or more smaller pages (e.g., 310-2 and 310-4). Also, each element can provide direct access to the page (via reference data structure 314) represented by the element or to the sub-array describing the element at a finer granularity. That is, variable page size multilevel page tables according to various embodiments of the present disclosure can allow each individual page to be mapped by a single data structure 314, regardless of page size.

For example, a 64 KB page can be referenced by a single data structure 314 rather than being referenced using 16 separate 4 KB data structures to represent each 4 KB "base" page. In another example, a 68 KB block of data can be represented by a sub-array including a 64 KB sub-array element and a 4 KB sub-array element. Such a page size could also be represented by a single 256 KB sub-array element.

In a further example, a 69 KB block of data can be represented, for example, by a 64 KB sub-array and two 4 KB sub-arrays (e.g., if 4 KB is the lowest level of granularity supported by the system) or by a 64 KB sub-array and a 16 KB sub array. The 64 KB sub-array and two 4 KB sub-arrays provided the benefit of being a closer fit to the size of the page since the sub-array's total size is 72 KB versus 80 KB for the 64 KB and 16 KB sub-array method, and therefore, may be beneficial in some embodiments. A benefit of the 64 KB and 16 KB sub-array method is that it includes fewer sub-array levels and therefore, may be beneficial in some embodiments. These benefits may also apply to the methods described above (e.g., the 64 KB and 4 KB and the 256 KB sub-array methods).

Using a single data structure to reference each page without regard to page size conserves main memory (e.g., RAM) because the page table can be considerably smaller. Therefore, a multilevel page table can remain in main memory during process execution. Such systems can reduce or eliminate the use of complex logic in order to page a page table within a particular system.

Figure 4:
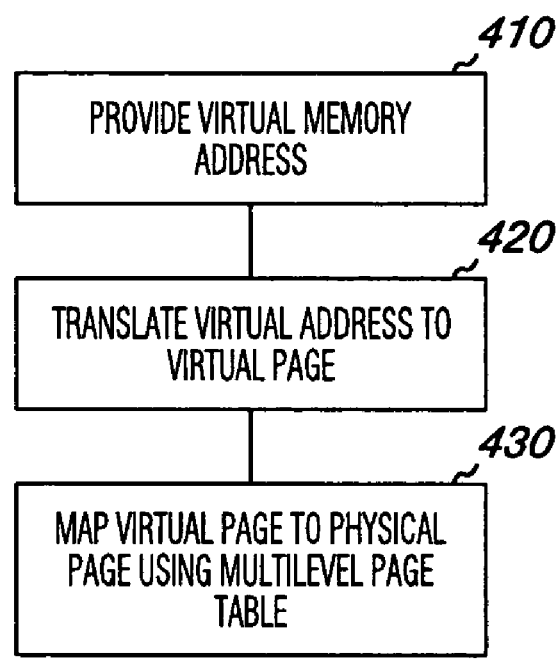
FIG. 4 is a block diagram of a method embodiment of the present disclosure.

FIG. 4 is a block diagram of a method embodiment. Unless explicitly stated, the method embodiments described herein are not constrained to a particular order or sequence. Additionally, some of the described method embodiments or elements thereof can occur or be performed at the same point in time.

The embodiments described herein can be performed by software and/or firmware (e.g., computer executable instructions), hardware, application modules, and the like, executable and/or resident on the systems and devices shown or described herein or otherwise. The embodiments of the invention are not limited to any particular operating environment or to instructions written in a particular programming language. Software, firmware, and/or processing modules, suitable for carrying out embodiments of the present invention, can be resident in one or more devices or locations. Processing modules can include separate modules connected together or include several modules on an application specific integrated circuit (ASIC).

In the embodiment shown in FIG. 4, a block diagram shows various elements in one embodiment of a method of the present disclosure. As shown at block 410, the method includes providing a virtual address. Virtual memory addresses can correspond to data desired by processes and can be provided by a system processor (e.g., a CPU), as discussed in connection with FIGS. 1B, 2 and 3.

As shown at block 420, the method of FIG. 4 includes translating a virtual address to an associated virtual page as discussed previously in connection with FIGS. 2 and 3. The method also includes mapping a virtual memory page to a physical memory page by using a multilevel page table, as illustrated in block 430.

In various embodiments of the present disclosure, executable instructions can be executed to map a virtual page to physical page by referencing each page of a variable page size memory object with a data structure within a multilevel page table. In various embodiments, executable instructions can be executed to configure the multilevel page table such that the order of the sub-arrays and the depth of the page table correspond to various page sizes that are supported by a given operating system and or hardware. In various embodiments, executable instructions can be executed to perform each of the elements represented in FIG. 4, as described herein.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure include more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for memory management, comprising:
   providing an operating system capable of supporting variable page sizes;
   obtaining a virtual memory address that corresponds to requested data;
   translating the virtual memory address to a virtual memory page; and
   mapping the virtual memory page to a physical memory page by using a multilevel page table, wherein the multilevel page table depth depends on the number of variable page sizes supported by the operating system.

2. The method of claim 1, wherein the mapping includes locating the physical memory page by using a single data structure to reference the physical memory page, and wherein the virtual memory page is capable of having a variable size.

3. The method of claim 2, wherein locating the physical page includes using a virtual frame descriptor disk block descriptor data structure to reference the physical memory page.

4. The method of claim 1, wherein using the multilevel page table includes using a page table having a depth of at least three.

5. The method of claim 1, wherein the method includes providing a virtual memory address that corresponds to data requested by a process.

6. The method of claim 1, wherein the method includes providing a processor capable of supporting a number of page sizes, and wherein the method further includes matching a page table level size for each of a number of table level element to correspond to a page size supported by the processor.

7. A computing device, comprising:
   a processor capable of supporting variable page sizes;
   a memory in communication with the processor; and
   executable instructions storable in memory and executable on the processor to:
      provide a virtual memory address corresponding to requested data;
      translate the virtual memory address to a virtual memory page, the virtual memory page capable of having a variable size; and
      map the virtual memory page to a physical memory page by using a multilevel page table, wherein the multilevel page table depth depends on the number of variable page sizes supported by the operating system.

8. The device of claim 7, including executable instructions that execute to maintain the multilevel page table in a main memory location.

9. The device of claim 7, including executable instructions that execute to locate the physical memory page by using a single reference data structure.

10. The device of claim 7, including executable instructions that execute to organize the multilevel page table, the multilevel page table comprising:
    a first level including an array of elements of fixed size, the array elements capable of being mapped by a collection of pages, wherein the mapping includes a lower level including a sub-array of elements of fixed size.

11. The device of claim 10, wherein the size of a first fixed size array element is equal to the sum of the sizes of a number of other fixed size elements associated with the first fixed size array element in a number of arrays at a number of lower levels.

12. The device of claim 11, wherein the size of the first fixed size array corresponds to the size of a virtual memory space allocated to a process.

13. A computer readable medium having executable instructions thereon being executed to cause a device to perform a method, comprising:
    representing a memory object wherein the multilevel page table depth depends on the number of variable page sizes supported by the operating system, by using a multilevel page table, wherein the multilevel page table describes the memory object as a single data structure of virtual memory page array and sub-array elements and wherein:
       the elements have a fixed size; and
       the elements represent data, including:
          a virtual page; and
          a collection of virtual pages;
    receiving a request for a virtual memory address based on data sought by a process;
    translating the virtual memory address to a virtual memory page;
    locating the virtual memory page in the multilevel page table; and
    locating a physical memory page by using the multilevel page table.

14. The medium of claim 13, the method including representing a variable page size memory object by using the multilevel page table.

15. The medium of claim 14, the method including locating the physical memory page by using one reference data structure to reference the pages of the variable page size memory object.

16. The medium of claim 15, the method including providing direct access to array elements representing virtual pages and array elements representing collections of virtual pages based on the virtual memory address.

17. The medium of claim 15, the method including maintaining the multilevel page table in a main memory.

18. A computing system, comprising:
    a processor capable of supporting variable page sizes;
    a memory in communication with the processor; and
    means for mapping a variable page size memory object by using a multilevel page table, wherein the multilevel page table depth depends on the number of variable page sizes supported by the operating system, by matching a single data structure of virtual memory page array and sub-array elements to correspond to a page size supported by the processor.

19. The system of claim 18, wherein the multilevel page table includes at least three levels.

20. The system of claim 18, wherein the processor is capable of supporting at least 4 page sizes.

* * * * *

UNITED STATES PATENT AND TRADEMARK OFFICE
CERTIFICATE OF CORRECTION

PATENT NO. : 7,516,297 B2 Page 1 of 1
APPLICATION NO. : 11/272155
DATED : April 7, 2009
INVENTOR(S) : Clifford J. Mather It is certified that error appears in the above-identified patent and that said Letters Patent is hereby corrected as shown below:

In column 10, lines 16-18, in Claim 13, delete "wherein the multilevel page table depth depends on the number of variable page sizes supported by the operating system," and insert the same in line 19 before "wherein".

In column 10, line 21, in Claim 13, after "elements" insert -- , --.

Signed and Sealed this

Eighth Day of September, 2009

David J. Kappos
*Director of the United States Patent and Trademark Office*